United States Patent [19]

Fujii

[11] Patent Number: 4,752,126

[45] Date of Patent: Jun. 21, 1988

[54] SURVEYING INSTRUMENT

[75] Inventor: Kenji Fujii, Kawasaki, Japan

[73] Assignee: Nippon Kogaku K. K., Tokyo, Japan

[21] Appl. No.: 943,064

[22] Filed: Dec. 18, 1986

[30] Foreign Application Priority Data

Dec. 26, 1985 [JP] Japan ................................ 60-295949

[51] Int. Cl.$^4$ ............................................. G01B 11/26
[52] U.S. Cl. ..................... 356/140; 356/147; 33/285
[58] Field of Search ....................... 356/138, 140, 147; 33/1 N, 1 PT, 281, 285

[56] References Cited

U.S. PATENT DOCUMENTS 4,093,383  6/1978  Feist et al. ...................... 356/147 X
4,441,812  4/1984  Feist .................................. 356/147

Primary Examiner—Gene Wan
Assistant Examiner—Robert J. Pascal
Attorney, Agent, or Firm—Shapiro and Shapiro

[57] ABSTRACT

A surveying instrument in which the azimuth angle setting device is incorporated has a collimating telescope which is rotatable around at least a vertical axis. The azimuth angle setting device comprises horizontal angle detection means for producing an electrical signal corresponding to at least a horizontal angle around which the collimating telescope rotates, input means for entering a coordinate, memory means for storing the horizontal angle signal produced by the horizontal angle detection means and the input coordinate entered by the input means, and processing means for calculating a direction of magnetic north based on the coordinate of a measurement point at which the surveying instrument is mounted, entered to the memory means by the input means and a coordinate of a target to be collimated by the collimating telescope. An azimuth angle relative to the magnetic north is determined by the processing means based on the horizontal angle of the horizontal angle detection means when the target is collimated and the magnetic north, and the azimuth angle is displayed on a display.

9 Claims, 3 Drawing Sheets

SURVEYING INSTRUMENT

BACKGROUND OF THE INVENTION

1. Field of the Invention

The present invention relates to an azimuth angle setting device of a surveying instrument, and more particularly to a surveying instrument having a collimating telescope and an angle reader which produces an electrical signal corresponding at least to a horizontal angle.

2. Related Background Art

In the surveying instrument such as a transit having a collimating telescope having a collimating line set to cross a vertical axis and a horizontal angle readout scale, the magnetic north is examined by a compass and a scale is set to 0° while the collimating telescope is oriented to the magnetic north, and then the collimating telescope is oriented to a collimating point to be measured so that an azimuth angle is detected with reference to the magnetic north. In this method, however, a high precision compass is required, and if there is a ferromagnetic material in a vicinity of the surveying instrument, an error is included in the azimuth angle. In a method for determining the azimuth angle without using the compass, a coordinate of the surveying instrument is determined by a back intersection method based on two or more known positions, one of the known collimating points is collimated, an azimuth angle is calculated by a desk-top calculator and the resulting angle is entered into the surveying instrument. This method results in errors in calculation and decrease of work efficiency.

SUMMARY OF THE INVENTION

It is an object of the present invention to provide an azimuth angle setting device which can set a horizontal azimuth angle without error by a simple construction.

A surveying instrument in which the azimuth angle setting device of the present invention is incorporated has a collimating telescope which is rotatable around at least a vertical axis. The azimuth angle setting device comprises horizontal angle detection means for producing an electrical signal corresponding to at least a horizontal angle around which the collimating telescope rotates, input means for entering a coordinate, memory means for storing the horizontal angle signal produced by the horizontal angle detection means and the input coordinate entered by the input means, and processing means for calculating a direction of magnetic north based on the coordinate of a measurement point at which the surveying instrument is mounted, entered to the memory means by the input means and a coordinate of a target to be collimated by the collimating telescope. An azimuth angle relative to the magnetic north is determined by the processing means based on the horizontal angle of the horizontal angle detection means when the target is collimated and the magnetic north, and the azimuth angle is displayed on a display.

In accordance with the present invention, the azimuth angle is easily determined without using the magnet. Further, since manual calculation is omitted, the azimuth angle can be correctly and simply determined.

The present invention will be fully understood from the following detailed description done with reference to the accompanying drawings.

DESCRIPTION OF THE PREFERRED EMBODIMENTS

Figure 1:
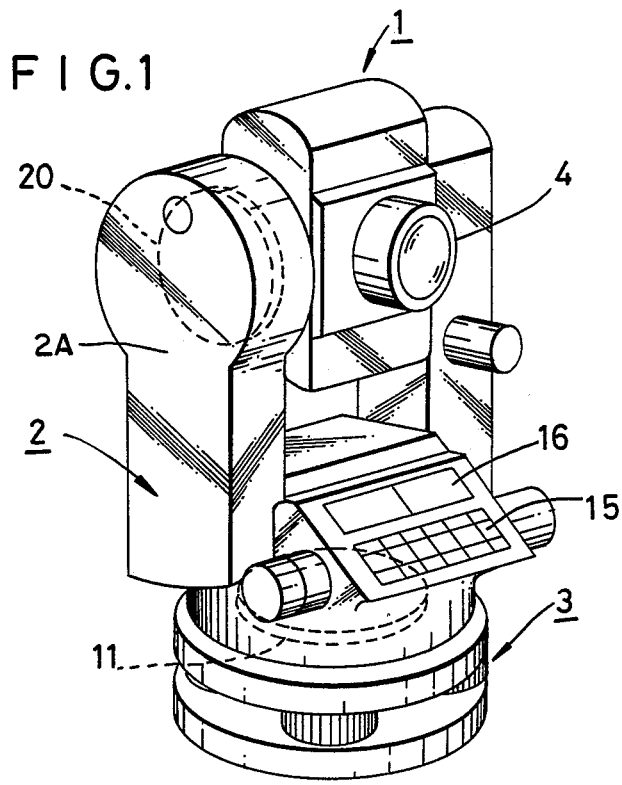
FIG. 1 shows a perspective view of a transit in which an embodiment of the present invention is incorporated.

FIG. 1 shows a perspective view of a digital transit with a range finder in which an embodiment of the present invention is incorporated. It comprises a telescope body 1, a transit body 2 for rotatably supporting the telescope body 1 around a horizontal axis, and a table 3 for rotatably supporting the transit body 2 around a vertical axis. Arranged in the telescope body 1 are a collimating telescope 4 and a range finder which measures a distance to a target collimated by the collimating telescope 4, through an objective lens of the collimating telescope. A first encoder 11 for reading a rotation angle horizontal angle of the transit body 2 relative to the table 3 is arranged at the bottom of the transit body 2, and a second encoder 20 for reading a rotation angle (vertical angle) of the collimating telescope 4 is arranged in an upper post 2A which supports the telescope body 1.

Figure 2:
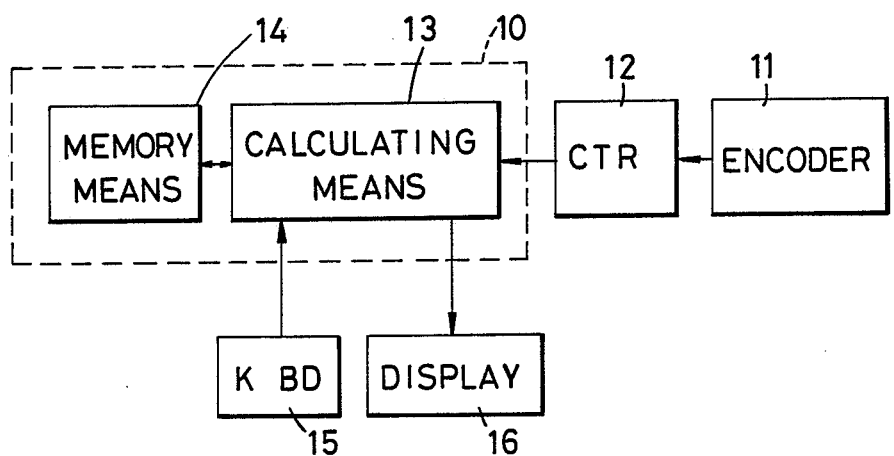
FIG. 2 shows a block diagram of a first embodiment of the present invention.
Figure 3:
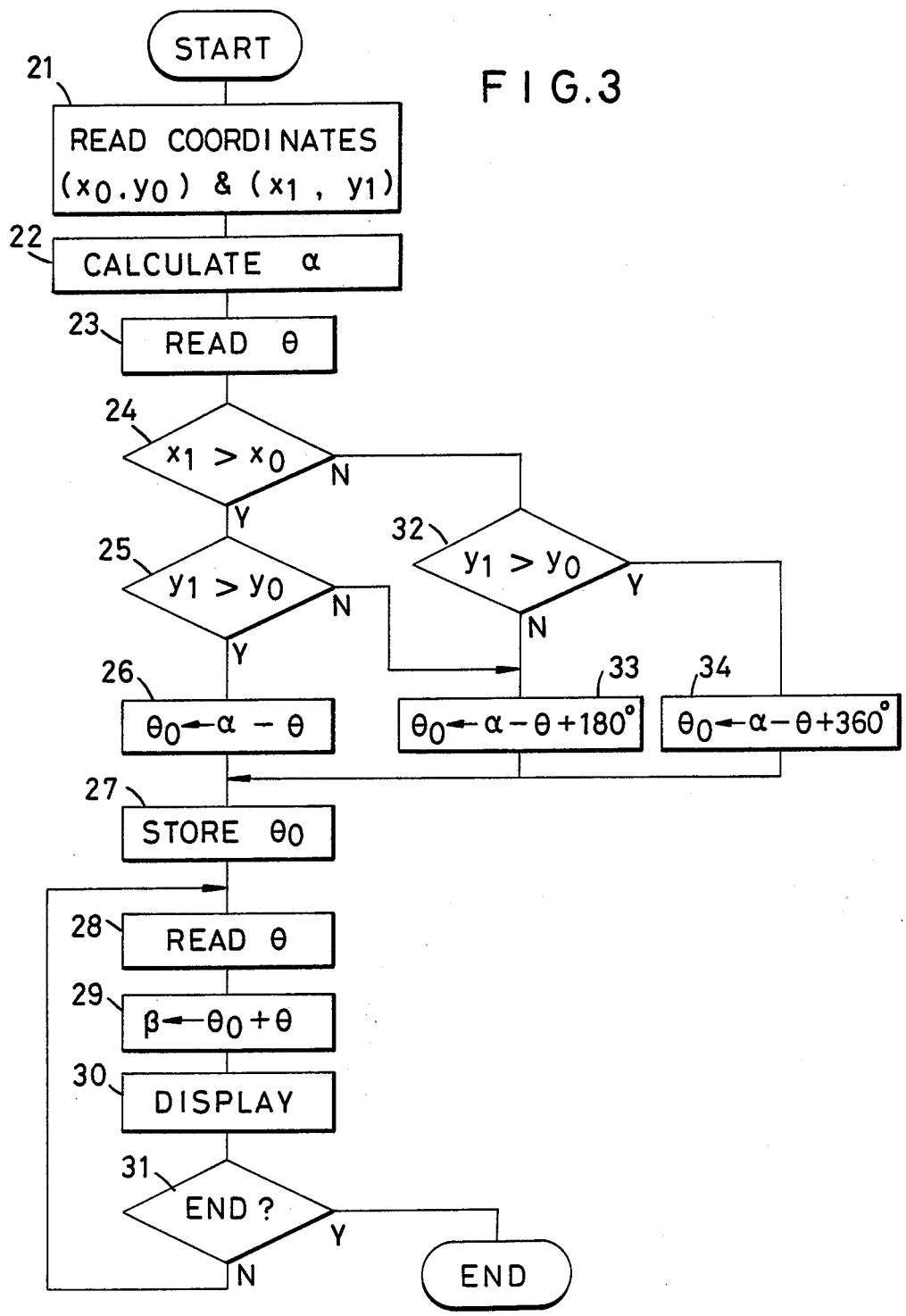
FIG. 3 shows a flow chart of a microcomputer shown in FIG. 2.

FIG. 2 shows a block diagram of a first embodiment of the present invention, and FIG. 3 shows a flow chart of a microcomputer 10 of FIG. 2.

In FIG. 2, pulse signals from the first encoder 11 for reading the horizontal angle are counted by an up/down counter 12, and the count of the counter 12 is read into the microcomputer 10, converted to an angle, and displayed on a display device 16 arranged on the transit body. The microcomputer 10 includes processing means 13 and a memory 14, and processes data such as coordinates entered by a keyboard 15 adjacent to the display device 16.

The first encoder 11 for reading the horizontal angle may be a photo-electric rotary encoder or a magnetic rotary encoder.

The microcomputer 10 reads in the coordinate entered from the keyboard 15, that is, the coordinate of a measurement point at which the surveying instrument is positioned, and a coordinate of other known point and displays an azimuth angle (horizontal angle when a 0° position of a horizontal scale of the first encoder 11 is set to the magnetic north) on the display device 16 by the flow chart shown in FIG. 3.

An operator mounts the transit at a measurement point of a known coordinate, collimates a target at any known coordinate, collimates a target at any known point, enters the coordinates of the measurement point and the target by the keyboard 15, and turns on a display key to display an azimuth angle. As shown in the flow chart of FIG. 3, the microcomputer 10 fetches from an internal memory the coordinate of the measurement point at which the transit is mounted and the coordinate of the known point in response to the turn-on of the display key. Then, the magnetic north is calculated based on the coordinates of the two known points and determines an angle of the 0° position of the horizontal scale relative to the magnetic north, based on the count of the counter 12, and the horizontal scale is placed to the azimuth angle and stored in the memory 14. Then, the azimuth angle is displayed on the display 16.

Referring to FIG. 3, in a step 21, two coordinates ($x_o$, $y_o$) and ($x_1$, $y_1$) are fetched from the internal memory. It is assumed that the y-axis of the x-y coordinate is oriented to the magnetic north, and the coordinate of the measurement point is given by ($x_o$, $y_o$) and the coordinate of the target is given by ($x_1$, $y_1$). In a step 22, the azimuth angle $\alpha$ when the target is collimated is calculated by the following formula (1).

$$\alpha = \tan^{-1}\left(\frac{x_1 - x_o}{y_1 - y_o}\right) \quad (1)$$

In a step 23, the count of the counter 12, that is, the angle $\theta$ between the direction corresponding to 0° of the horizontal scale and the collimation direction of the target is read and stored in the internal memory. In a step 24, $x_o$ and $x_1$ are compared, and in steps 25 and 32, $y_o$ and $y_1$ are compared. In steps 26 and 33, an angle $\theta_o$ between the direction of 0° of the horizontal scale of the encoder 11 and the magnetic north is calculated by formulas (2), (3) and (4) in accordance with the steps 24, 25 and 32.

(i) When $x_1 > x_o$ and $y_1 > y_o$:

$$\theta_o = \alpha - \theta \quad (2)$$

(ii) When $x_1 > x_o$ and $y_o > y_1$:

$$\theta_o = \alpha - \theta + 180° \quad (3)$$

(iii) When $x_o > x_1$ and $y_o > y_1$: same as (ii)
(iv) When $x_o > x_1$ and $y_1 > y_o$:

$$\theta_o = \alpha - \theta + 360° \quad (4)$$

In a step 27, the calculated $\theta_o$ is stored in the internal memory. In a step 28, the content of the counter 11 corresponding to the angle $\theta$ is read. In a step 29, $\theta$ and $\theta_o$ are summed and the sum is stored in the internal memory as the azimuth angle $\beta$. In a step 30, the sum $\beta$ stored in the internal memory is displayed. In a step 31, whether or not an end key has been depressed by the operator to indicate the end of measurement is checked. If the end key has not been depressed, the process returns to the step 28. A direction from a positive side of the y-axis to a positive side of the x-axis is assumed to be a positive direction of the rotation angle of the first encoder 11.

In the first embodiment described above, the second encoder 20 for reading the vertical angle of the transit and the range finder in the telescope body 1 are not used. Accordingly, the surveying instrument used in the first embodiment may not have the encoder to read the rotation angle of the collimating telescope or the range finder.

While the two-dimensional azimuth angle setting device has been described, a three-dimensional device may be used.

Figure 4:
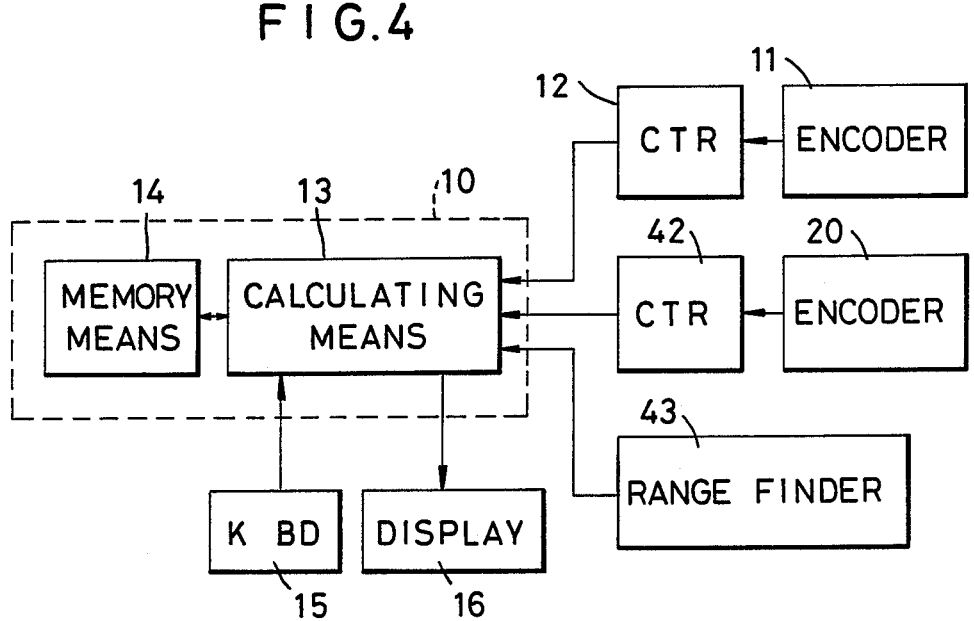
FIG. 4 shows a block diagram of a second embodiment of the present invention.

Referring to FIG. 4, a second embodiment of the present invention is explained. In FIG. 4, a second encoder 20 for reading the vertical angle a counter 42 and a range finder for measuring a distance to the target are provided. In FIG. 4, the like elements to those shown in FIG. 2 are designated by the like numerals.

The second embodiment shown in FIG. 4 has the same functions as those of the first embodiment shown in FIG. 2. Even if the surveying instrument is located at a position of unknown coordinate, the coordinate of the measurement point at which the surveying instrument is mounted is determined by a back intersection method based on the two known coordinates, and the azimuth angle can be displayed in the same process as that described in the first embodiment based on one of the two known coordinates and the coordinate of the measurement point.

The coordinate ($x_1$, $y_1$) of one known point is entered into the internal memory by the keyboard 15, the distance to the one known point is measured, a distance $l_1$ on an x-y coordinate system from the measurement point to the one known point is calculated based on the measured distance and the vertical angle from the second encoder, and the calculated result is stored in the internal memory. Similarly, a coordinate ($x_2$, $y_2$) of the other known point and a distance on the x-y coordinate system from the measurement point to the coordinate ($x_2$, $y_2$) of the other known point are stored into the internal memory. A coordinate ($x_o$, $y_o$) of the measurement point is determined by the following formulas based on the data stored in the internal memory.

$$(x_1 - x_o)^2 + (y_1 - y_o)^2 = l_1^2$$

$$(x_2 - x_o)^2 + (y_2 - y_o)^2 = l_2^2$$

The calculated coordinate ($x_o$, $y_o$) is stored into the internal memory. The azimuth angle is displayed in accordance with the flow chart shown in FIG. 3. If the display key is depressed when the known point at that coordinate ($x_2$, $y_2$) is collimated, the azimuth angle at the known point at the coordinate ($x_2$, $y_2$) is displayed.

A counter 42 in FIG. 4 is an up/down counter like the counter 12. A range finder 43 sends a signal representing a linear distance to the target, to the microcomputer 10.

I claim:
1. An azimuth angle setting device of a surveying instrument having a collimating telescope rotatable around at least a vertical axis, comprising:
horizontal angle detection means for producing a horizontal angle signal corresponding to a horizontal rotation angle of said collimating telescope;
input means for entering a coordinate of a position;
processing means for determining an azimuth angle of magnetic north based on a coordinate of a measurement point at which said surveying instrument is mounted and a coordinate of a target collimated by said collimating telescope, and calculating an azimuth angle relative to the magnetic north based on said horizontal angle signal produced by said horizontal angle detection means when said target is collimated and the azimuth angle of the magnetic north;
memory means for storing said horizontal angle signal produced by said horizontal angle detection means, the coordinates of said measurement point and said target entered by said input means and the azimuth angle calculated by said processing means; and
a display device for displaying the coordinates stored in said memory means and the azimuth angle calculated by said processing means.

2. An azimuth angle setting device according to claim 1 wherein said horizontal angle detection means includes a rotary encoder for producing a pulse signal in accordance with horizontal rotation of said collimating telescope and a counter for counting the pulse signal.

3. An azimuth angle setting device according to claim 1 further comprising:
   a vertical angle detection means for producing a vertical angle signal representing a vertical angle of said collimating telescope; and
   a range finder for measuring distances to at least two targets;
   wherein said processing means calculates a coordinate of said surveying instrument based on signals from said horizontal angle detection means and said vertical angle detection means produced by collimating two targets by said collimating telescope and the respective distances measured by said range finder, and calculating the azimuth angle.

4. An azimuth angle setting device according to claim 3 wherein said horizontal angle detection means includes a first rotary encoder for producing a first pulse signal for every predetermined amount of horizontal rotation of said collimating telescope and a counter for counting said first pulse signal, and said vertical angle detection means includes a second rotary encoder for producing a second pulse signal for every predetermined amount of vertical rotation of said collimating telescope and a counter for counting said second pulse signal.

5. An apparatus for determining an azimuth angle between a collimation direction of a collimating telescope and magnetic north in accordance with a first coordinate at which said apparatus is mounted and a second coordinate of a target collimated by said collimating telescope, comprising;
   (a) memory means;
   (b) input means for inputting data on said first and second coordinates into said memory means;
   (c) output means for detecting a rotation angle of said collimating telescope relative to a predetermined position to produce a rotation angle detection signal representing a rotation angle; and
   (d) processing means for calculating the azimuth angle in accordance with the data on said first and second coordinates stored in said memory means and said rotation angle detection signal.

6. An apparatus for determining an azimuth angle according to claim 5 wherein said processing means calculates the angle between said predetermined position and the magnetic north in accordance with the data on said first and second coordinates stored in said memory means and said rotation angle detection means.

7. An apparatus for determining an azimuth angle according to claim 6 wherein said processing means calculates a difference between the rotation angle represented by said rotation angle detection signal and the angle between said predetermined position and the magnetic north.

8. An apparatus for determining an azimuth angle according to claim 6 wherein said calculation means stores data on the angle between said predetermined position and the magnetic north into said memory means.

9. An apparatus for determining an azimuth angle according to claim 5 wherein said processing means compares said first and second coordinates.

* * * * *